(12) United States Patent
Lemieux

(10) Patent No.: US 8,970,795 B2
(45) Date of Patent: Mar. 3, 2015

(54) SLIDING PANELS SYSTEM FOR HIDING A FLAT SCREEN TV

(71) Applicant: Alain Lemieux, Rosemere (CA)

(72) Inventor: Alain Lemieux, Rosemere (CA)

( * ) Notice: Subject to any disclaimer, the term of this patent is extended or adjusted under 35 U.S.C. 154(b) by 61 days.

(21) Appl. No.: 13/871,387

(22) Filed: Apr. 26, 2013

(65) Prior Publication Data

US 2014/0319978 A1     Oct. 30, 2014

(51) Int. Cl.
*A47B 81/06* (2006.01)
*F16M 13/02* (2006.01)

(52) U.S. Cl.
CPC ............... *A47B 81/06* (2013.01); *F16M 13/02* (2013.01); *A47B 81/062* (2013.01)
USPC ............................. 348/836; 49/123; 312/7.2

(58) Field of Classification Search
CPC .... A47B 81/06; A47B 81/064; A47B 81/061; A47B 81/062; A47B 81/068; A47B 81/067
USPC ............ 49/116, 118, 123, 409, 140; 312/7.2, 312/205, 245, 246; 348/836
See application file for complete search history.

(56) References Cited

U.S. PATENT DOCUMENTS

| | | | | |
|---|---|---|---|---|
| 736,357 | A * | 8/1903 | Brousseau | 160/118 |
| 1,857,368 | A | 5/1932 | Flynn et al. | |
| 2,235,380 | A * | 3/1941 | McCormick | 187/319 |
| 2,547,447 | A | 4/1951 | De Boer | |
| 2,905,463 | A * | 9/1959 | Borden | 49/360 |
| 3,456,995 | A * | 7/1969 | Nyquist | 312/322 |
| 4,050,191 | A * | 9/1977 | Azuma | 49/360 |
| 4,910,916 | A * | 3/1990 | Dubach et al. | 49/257 |
| 4,935,819 | A | 6/1990 | Pederson | |
| 5,138,462 | A | 8/1992 | Skovgaard | |
| 5,264,765 | A | 11/1993 | Pecorino et al. | |
| 5,711,112 | A * | 1/1998 | Barten et al. | 49/118 |
| 6,073,375 | A * | 6/2000 | Fant et al. | 40/594 |
| 6,095,623 | A * | 8/2000 | Goto et al. | 312/7.2 |
| 6,152,549 | A * | 11/2000 | Goto et al. | 312/223.1 |
| 6,480,243 | B2 * | 11/2002 | Yamamoto | 348/836 |
| 6,901,987 | B1 | 6/2005 | Graham | |
| 6,902,243 | B2 * | 6/2005 | Bober | 312/306 |
| 6,968,645 | B2 * | 11/2005 | Epps et al. | 49/123 |
| 7,128,003 | B2 * | 10/2006 | Okninski | 108/147 |
| 7,178,775 | B2 * | 2/2007 | Pfister et al. | 248/292.14 |
| 7,204,569 | B2 * | 4/2007 | Walburn | 312/321.5 |
| 7,345,886 | B2 | 3/2008 | Bliven et al. | |
| 7,529,082 | B2 * | 5/2009 | Maruta | 312/7.2 |
| 7,866,622 | B2 * | 1/2011 | Dittmer | 248/421 |
| 2002/0084727 | A1 * | 7/2002 | Miller | 312/205 |
| 2003/0201372 | A1 * | 10/2003 | Dozier | 248/286.1 |
| 2004/0135476 | A1 * | 7/2004 | Gillengerten | 312/8.16 |

(Continued)

*Primary Examiner* — Katherine Mitchell
*Assistant Examiner* — Justin Rephann

(57) ABSTRACT

A sliding panels system for hiding a flat screen television, has a wall attachment panel, a pair of post members spaced from one another and attached to the wall attachment panel. Extendable upper and lower rail assemblies attached between the post members. A first side support bracket assembly connected between the upper and lower rail assemblies on first ends thereof, and a second side support bracket assembly connected between the upper and lower rail assemblies on second ends thereof, such that the space between the first and second support bracket assemblies can be adjusted by the extendable upper and lower rail assemblies; and first and second panel members respectively attached to the first and second support bracket assemblies, such that the first and second panel members can be moved between an open and a closed position.

9 Claims, 7 Drawing Sheets

(56) References Cited

U.S. PATENT DOCUMENTS

| | | | |
|---|---|---|---|
| 2005/0109892 A1* | 5/2005 | Bober et al. | 248/125.2 |
| 2005/0146251 A1* | 7/2005 | Gillengerten | 312/8.16 |
| 2005/0248243 A1* | 11/2005 | Bober | 312/306 |
| 2006/0170315 A1* | 8/2006 | Hoss | 312/319.7 |
| 2006/0255697 A1* | 11/2006 | Smieszek et al. | 312/21 |
| 2007/0108791 A1* | 5/2007 | Okninski | 296/97.12 |
| 2007/0170823 A1* | 7/2007 | Stannis et al. | 312/7.2 |
| 2008/0143219 A1* | 6/2008 | Free | 312/7.2 |
| 2008/0264308 A1* | 10/2008 | Wu | 108/147 |
| 2008/0297012 A1 | 12/2008 | Cooper | |
| 2010/0224751 A1* | 9/2010 | Hochhalter et al. | 248/314 |
| 2011/0079685 A1* | 4/2011 | Kwak | 248/65 |
| 2011/0198972 A1* | 8/2011 | Kirkeby et al. | 312/7.2 |
| 2012/0194750 A1* | 8/2012 | Carr | 348/841 |
| 2013/0127306 A1* | 5/2013 | Head | 312/7.2 |
| 2013/0257236 A1* | 10/2013 | Head | 312/7.2 |

* cited by examiner

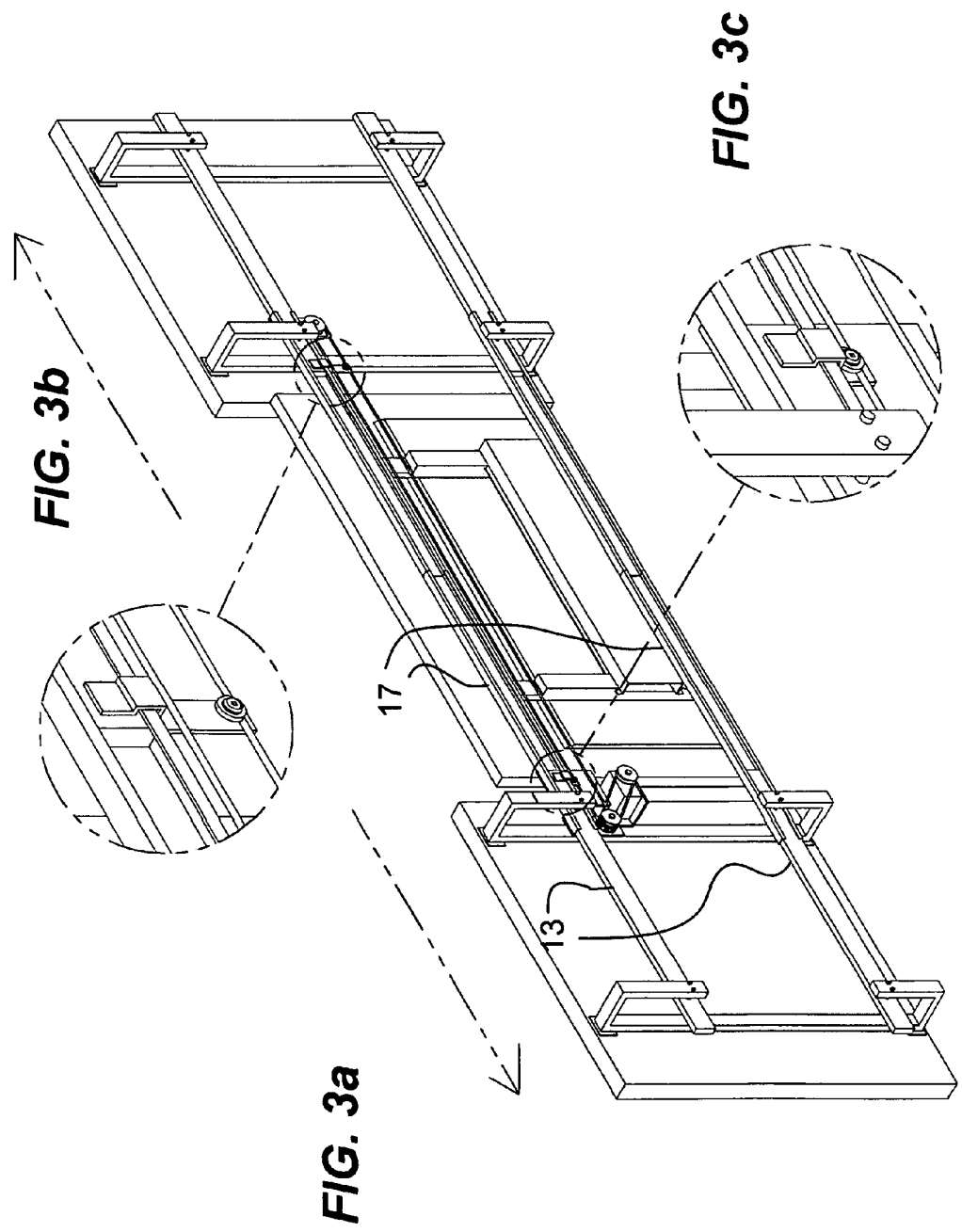

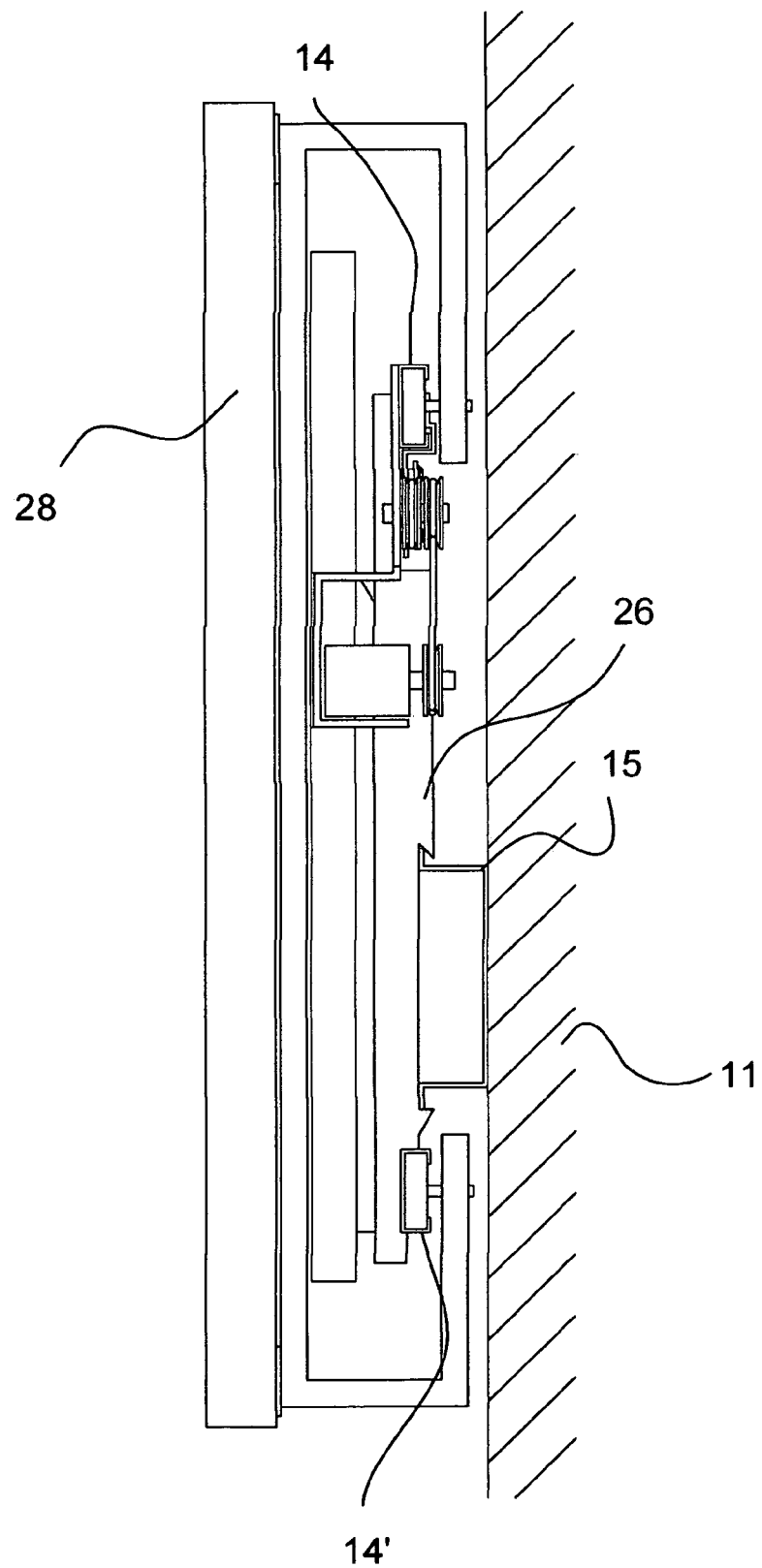

SLIDING PANELS SYSTEM FOR HIDING A FLAT SCREEN TV

This application claims priority based on request GB1209048.6 filed May 25, 2012

FIELD OF THE INVENTION

The present invention relates generally to sliding panels but more particularly to sliding panels system for hiding a flat screen TV.

BACKGROUND OF THE INVENTION

Flat screen TVs are quite common but their huge sizes are not always appreciated in some home decor. There has to be a practical way of hiding the screens. There does not seem to be readily available screen hiding devices in the marketplace.

SUMMARY OF THE INVENTION

In view of the foregoing disadvantages inherent in the known devices now present in the prior art, the present invention, which will be described subsequently in greater detail, is to provide objects and advantages which are:

To provide for a convenient means for hiding a large flat screen TV.

In order to do so, the invention consists of a sliding panels system for hiding a flat screen television having a frame structure consisting of a wall attachment panel adapted to be securely attached to a wall member, a pair of post members spaced from one another and attached to the wall attachment panel, Upper and lower rail assemblies are extendable, spaced apart, and parallel to one another and attached between the post members. A first side support bracket assembly connected between the upper and lower rail assemblies on first ends thereof, and a second side support bracket assembly connected between the upper and lower rail assemblies on second ends thereof, such that the space between the first and second support bracket assemblies can be adjusted by the extendable upper and lower rail assemblies; and first and second panel members respectively attached to the first and second support bracket assemblies, such that the first and second panel members can be moved between an open position wherein the panel members are spaced apart and a closed position wherein the panel members are abutting one another.

The sliding panels system is preferably comprised of a looped cable forming an upper loop portion and a lower loop portion, the upper loop portion attached at one point to a first portion of the extendable upper rail assembly via a first connector, and the lower loop portion attached at a second point to a second portion of the extendable upper rail assembly that is movable from the first portion of the upper rail assembly via a second connector. When the looped cable is rotated in one direction, the extendable upper and lower rail members extend outwards and move the first and second panel members away from one another, and when the looped cable is rotated in the opposite direction, the extendable upper and lower rail members retract inwards and move the first and second panel members towards one another.

The sliding panels system has the extendable upper rail assembly include an elongated bracket member extending a length upon the upper rail assembly that is greater than a maximum width of the space between the first and second panel members when the upper rail assembly is fully extended; and wherein the elongated bracket member includes a pulley member on each opposite end portion thereof, such that the looped cable is wrapped around both pulleys forming a taught elongated loop.

In a preferred embodiment, the sliding panels system has the upper rail assembly bracket member include an electric motor assembly located on an end portion thereof adjacent one of the pulley members> The electric motor assembly includes an electric motor, a motor wheel, a motor cable, and a transmission adapted to allow the motor wheel to turn in forward and reverse directions, wherein the motor cable is adapted to be connected between the motor wheel and the one of the pulley members, such that the electric motor assembly is adapted to mechanically open and close the first and second panel members.

The sliding panels system has the upper and lower rail assemblies each formed from two respective telescoping inner and outer rail members, such that the first connector is connected to a first telescoping part of the upper rail assembly, and the second connector is connected to a second telescoping part of the upper rail assembly.

In a preferred embodiment, the sliding panels system has the sliding panels are opened and closed by way of a remote control device.

The sliding panels work in combination with a flat screen television.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

BRIEF DESCRIPTION OF THE DRAWINGS

FIGS. 3*a-c* Isometric rear view with panels opened and isometric details of components.

FIG. 7 Side view of the invention.

DETAILED DESCRIPTION OF THE PREFERRED EMBODIMENT

Figure 1:
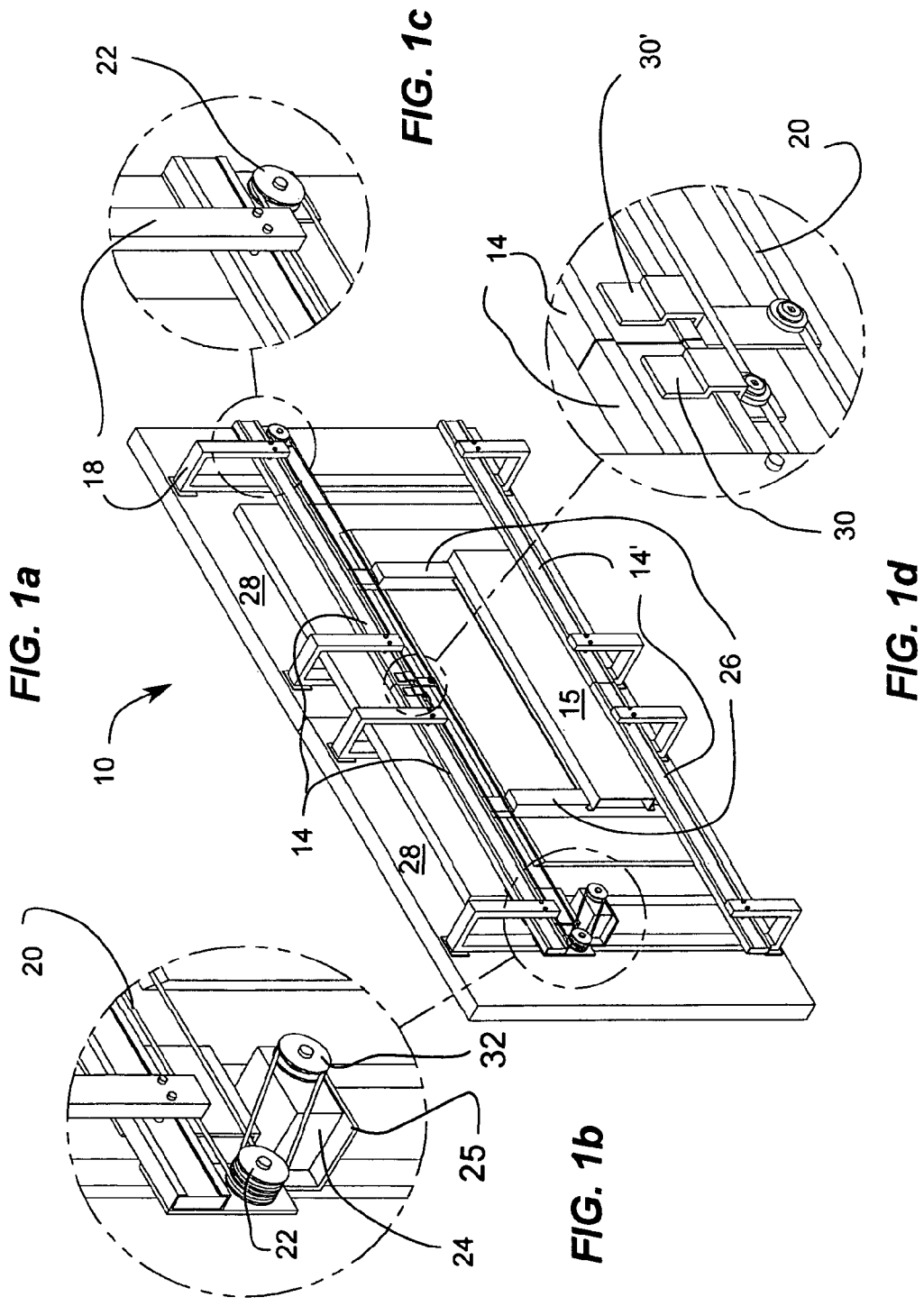
FIGS. 1*a-d* Isometric rear view and isometric detail views of the invention and its main components.
Figure 2:
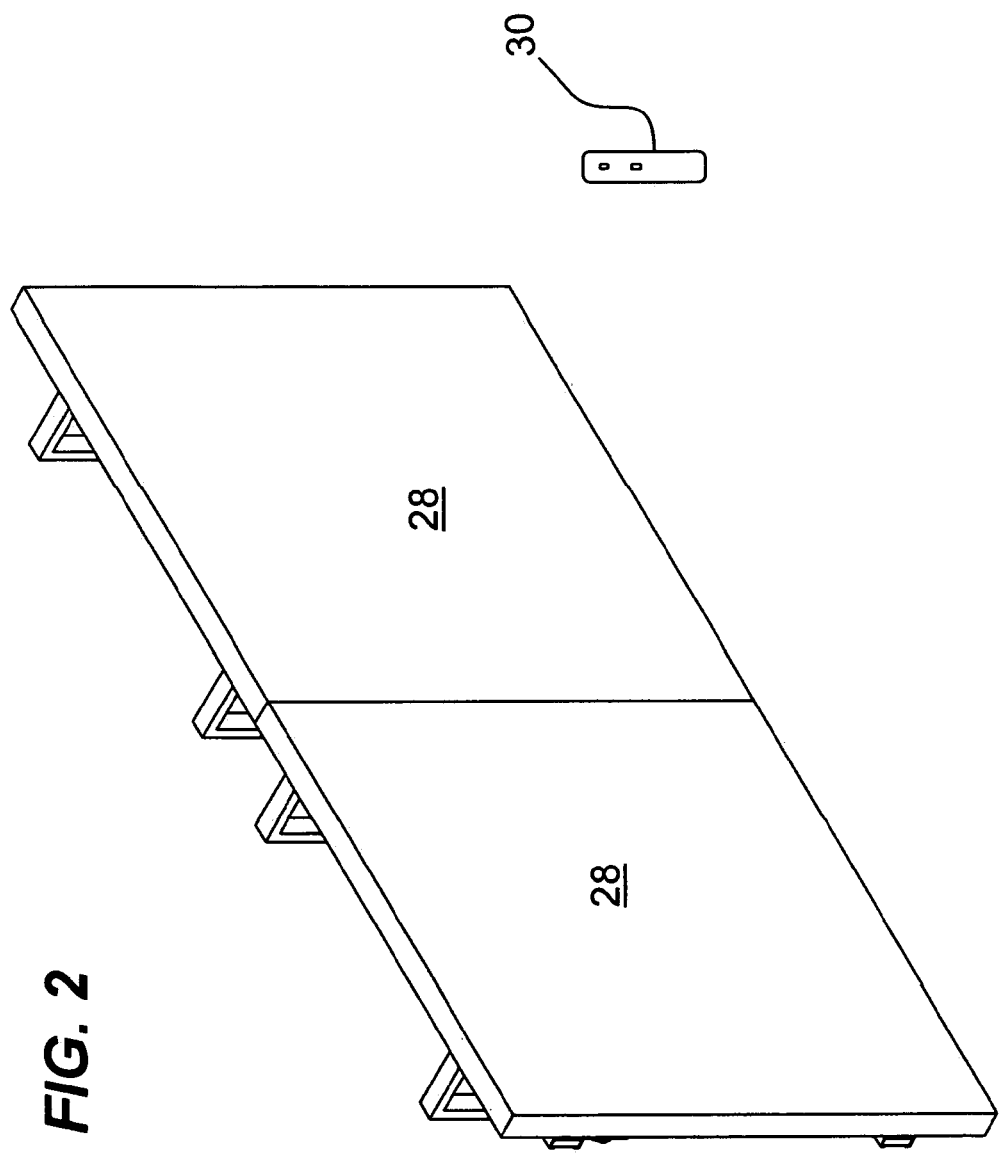
FIG. 2 Isometric front view of the invention with panels closed.
Figure 4A:
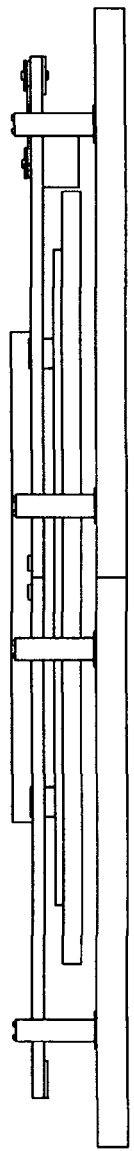
FIGS. 4*a-b* Top and front views with panels closed.
Figure 4B:
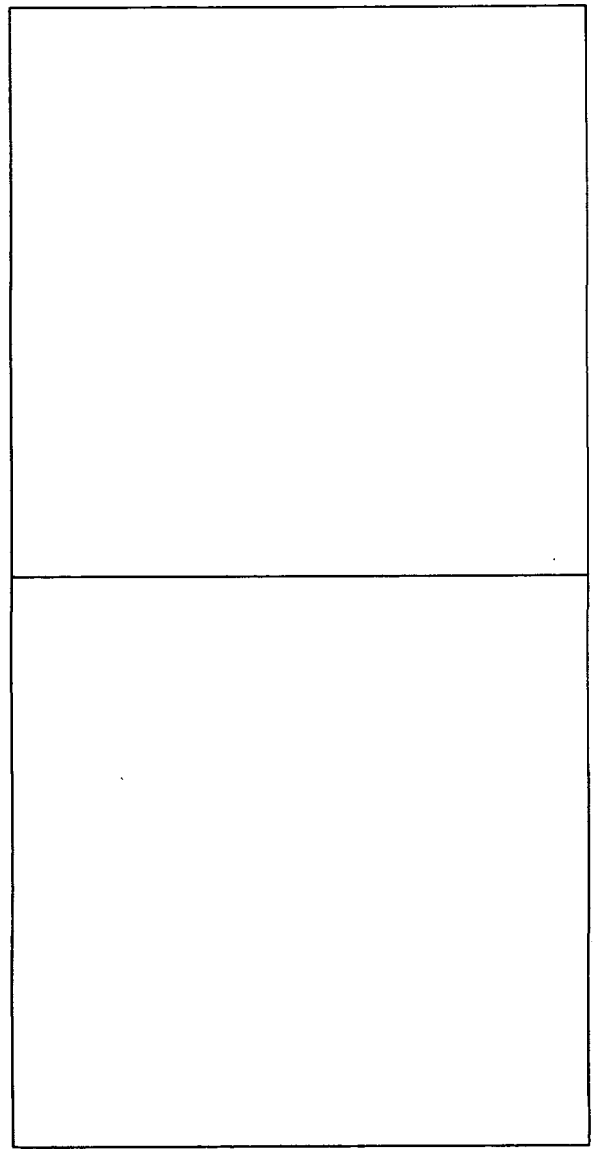
Figure 5A:
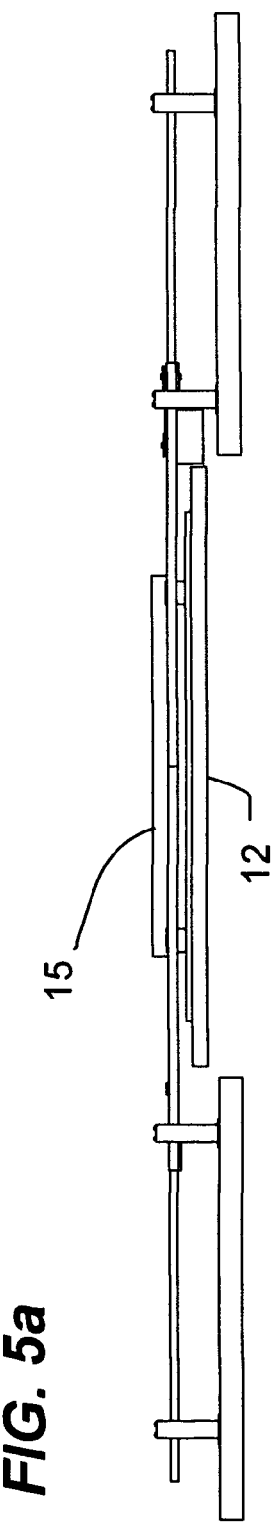
FIGS. 5*a-b* Top and front views with panels opened.
Figure 5B:
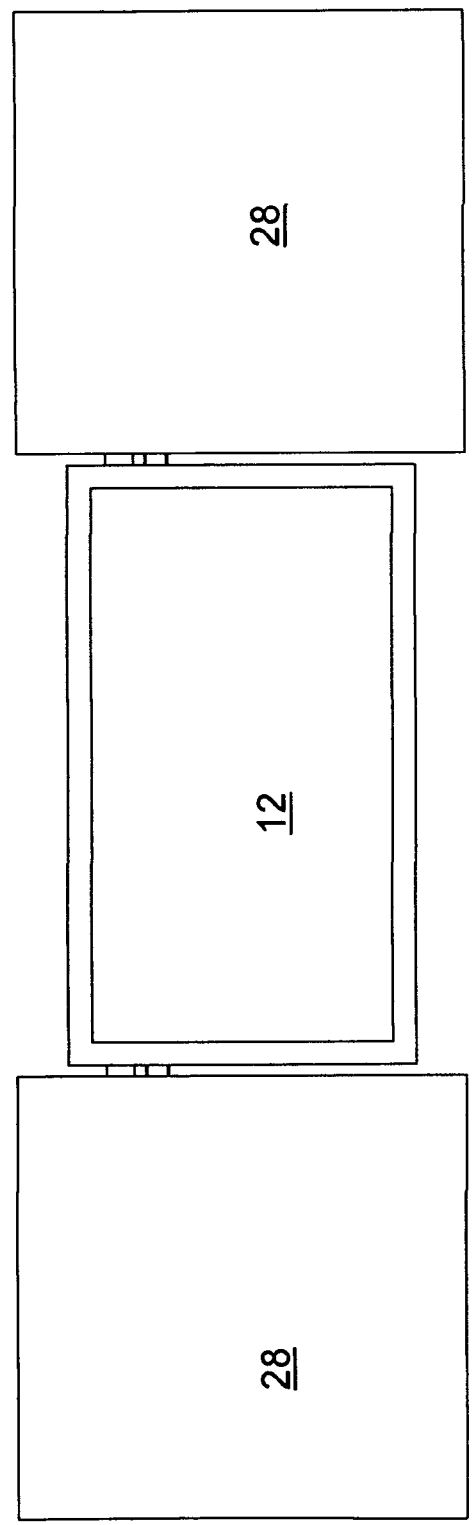
Figure 6:
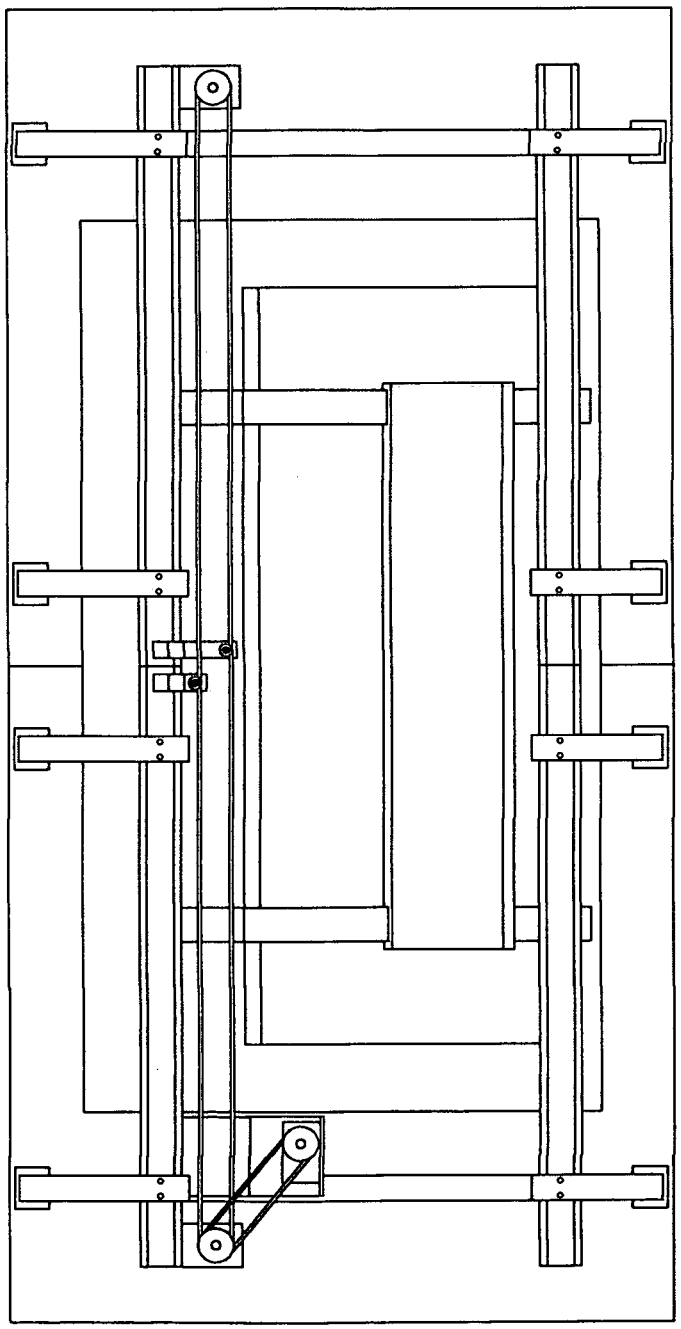
FIG. 6 Rear view of the invention.

A sliding panels system (10) for hiding a flat screen TV (12) has a frame structure comprised of a wall attachment panel (15) attached to a wall (11) on one side and connected to a pair of generally vertical post members (26) on the other side. The vertical post members (26) hold upper and lower rail assemblies (14, 14') perpendicularly therefrom. The rail assemblies (14, 14') are telescopic in nature, meaning that there is an inner rail members (13) sliding out from outer rail members (17). The rail assemblies are connected by way of support brackets (18) to panels (28).

A looped cable (20) is what pulls on the rail assemblies (14, 14') either apart or together so as to move the panels (28). The cable (20) is arranged in a "clothes line" fashion with a first connector (30) attached to the part of the looped cable (20) that runs top part of the cable (20) and a second connector (30') attached to the part of the cable (20) running on the bottom. The cable (20) is part of an assembly comprised of pulleys (22) and at least one electric motor assembly (24).

The motor assembly (24) is comprised of an electric motor (not shown), a transmission (not shown) and a motor wheel (32) as is known in the art and held in place by way of a motor assembly bracket (25).

Typically, a remote control device comprised of a remote unit (30) and an an associated signal receiver (not shown) control the opening and closing of the sliding panels system (10). Alternatively, or a wall switch (not shown) can also control the opening and closing.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A sliding panel system for hiding a flat screen television, said sliding panel system comprising a frame structure consisting of a wall attachment panel adapted to be securely attached to a wall member, a pair of post members spaced from one another and attached to said wall attachment panel, upper and lower rail assemblies that are extendable, spaced apart, and parallel to one another and attached between said post members, a first side support bracket assembly connected between said upper and lower rail assemblies on first ends thereof, and a second side support bracket assembly connected between said upper and lower rail assemblies on second ends thereof, such that a space between said first and second support bracket assemblies can be adjusted by said extendable upper and lower rail assemblies; and first and second panel members respectively attached to said first and second support bracket assemblies, such that said first and second panel members can be moved between an open position wherein said panel members are spaced apart and a closed position wherein said panel members are abutting one another; a looped cable forming an upper loop portion and a lower loop portion, said upper loop portion attached at one point to a first portion of said extendable upper rail assembly via a first connector, and said lower loop portion attached at a second point to a second portion of said extendable upper rail assembly that is movable from said first portion of said upper rail assembly via a second connector; such that when said looped cable is rotated in one direction, said extendable upper and lower rail members extend outwards and move said first and second panel members away from one another, and when said looped cable is rotated in the opposite direction, said extendable upper and lower rail members retract inwards and move said first and second panel members towards one another, said extendable upper rail assembly includes an elongated bracket member extending a length upon said upper rail assembly that is greater than a maximum width of a space between said first and second panel members when said upper rail assembly is fully extended; and wherein said elongated bracket member includes a pulley member on each opposite end portion thereof, such that said looped cable is wrapped around both pulleys forming a taught elongated loop.

2. The sliding panels system of claim 1, wherein said upper rail assembly bracket member includes an electric motor assembly located on an end portion thereof adjacent one of said pulley members, said electric motor assembly includes an electric motor, a motor wheel, a motor cable, and a transmission adapted to allow said motor wheel to turn in forward and reverse directions, wherein said motor cable is adapted to be connected between said motor wheel and said one of said pulley members, such that said electric motor assembly is adapted to mechanically open and close said first and second panel members.

3. The sliding panels system of claim 1, wherein said upper and lower rail assemblies are each formed from two respective telescoping inner and outer rail members, such that said first connector is connected to a first telescoping part of said upper rail assembly, and said second connector is connected to a second telescoping part of said upper rail assembly.

4. The sliding panels system of claim 1 wherein said sliding panels are opened and closed by way of a remote control device.

5. A combination of a flat screen television and a sliding panel system for hiding said flat screen television, said combination comprises said flat screen television, and said sliding panel system configured to hide said television set and comprising a frame structure consisting of a wall attachment panel adapted to be securely attached to a wall member, a pair of post members spaced from one another and attached to said wall attachment panel, upper and lower rail assemblies that are extendable, spaced apart, and parallel to one another and attached between said post members, a first side support bracket assembly connected between said upper and lower rail assemblies on first ends thereof, and a second side support bracket assembly connected between said upper and lower rail assemblies on second ends thereof, such that a space between said first and second support bracket assemblies can be adjusted by said extendable upper and lower rail assemblies; and first and second panel members respectively attached to said first and second support bracket assemblies, such that said first and second panel members can be moved between an open position wherein said panel members are spaced apart and a closed position wherein said panel members are abutting one another; a looped cable forming an upper loop portion and a lower loop portion, said upper loop portion attached at one point to a first portion of said extendable upper rail assembly via a first connector, and said lower loop portion attached at a second point to a second portion of said extendable upper rail assembly that is movable from said first portion of said upper rail assembly via a second connector; such that when said looped cable is rotated in one direction, said extendable upper and lower rail members extend outwards and move said first and second panel members away from one another, and when said looped cable is rotated in the opposite direction, said extendable upper and lower rail members retract inwards and move said first and second panel members towards one another; said extendable upper rail assembly includes an elongated bracket member extending a length upon said upper rail assembly that is greater than a maximum width of a space between said first and second panel members when said upper rail assembly is fully extended; and wherein said elongated bracket member includes a pulley member on each opposite end portion thereof, such that said looped cable is wrapped around both pulleys forming a taught elongated loop.

6. The sliding panels system of claim 5, wherein said upper rail assembly bracket member includes an electric motor assembly located on an end portion thereof adjacent one of said pulley members, said electric motor assembly includes an electric motor, a motor wheel, a motor cable, and a transmission adapted to allow said motor wheel to turn in forward and reverse directions, wherein said motor cable is adapted to be connected between said motor wheel and said one of said pulley members, such that said electric motor assembly is adapted to mechanically open and close said first and second panel members.

7. The sliding panels system of claim 5, wherein said upper and lower rail assemblies are each formed from two respective telescoping inner and outer rail members, such that said first connector is connected to a first telescoping part of said upper rail assembly, and said second connector is connected to a second telescoping part of said upper rail assembly.

8. The sliding panels system of claim 5, wherein said flat screen television is configured to fit between said upper and lower rail assemblies and said panel members.

9. The sliding system of claim 5 wherein said sliding panels are opened and closed by a remote control device.

* * * * *